H. C. HILL.
Nut-Lock.

No. 221,411. Patented Nov. 11, 1879.

Witnesses.
David G. Gordon
Chas. H. Owen

Inventor.
Henry C. Hill
by Theo. G. Ellis, Attorney.

UNITED STATES PATENT OFFICE.

HENRY C. HILL, OF MIDDLETOWN, CONNECTICUT.

IMPROVEMENT IN NUT-LOCKS.

Specification forming part of Letters Patent No. 221,411, dated November 11, 1879; application filed August 25, 1879.

*To all whom it may concern:*

Be it known that I, HENRY C. HILL, of Middletown, in the county of Middlesex and State of Connecticut, have invented certain new and useful Improvements in Nut-Locks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to devices for the purpose of locking the nuts upon bolts which are subjected to a jar, such as those which are used for attaching the fish-plates to railway-bars and other similar purposes, so that they cannot accidentally become loosened.

The object of my improvement is to provide a simpler and more effective nut-lock than has heretofore been in use, and one that can be cheaply made and readily used with the ordinary forms of bolts and nuts.

My invention consists in the construction of the locking-washer provided with a flexible rim, that will be hereinafter described.

Figure 1:
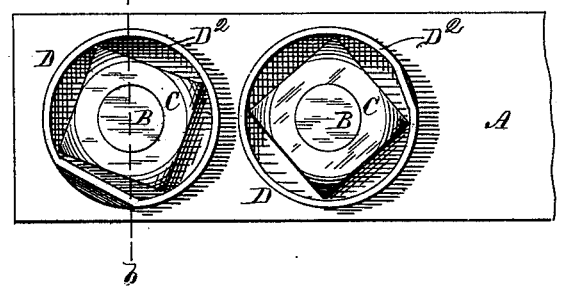
Figure 2:
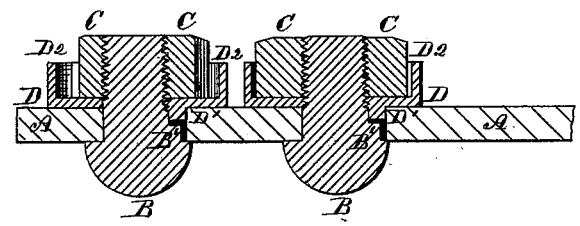
Figure 3:
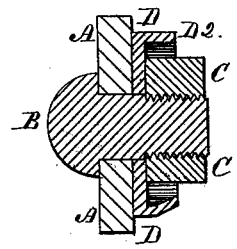
Figure 4:
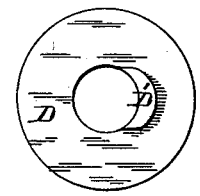

In the accompanying drawings, Figure 1 is a side view of a bar through which a bolt provided with my improved nut-lock is passed, and the nut secured upon the bolt. Fig. 2 is a horizontal section through the middle of Fig. 1. Fig. 3 is a vertical cross-section through the line $a\ b$ of Fig. 1. Fig. 4 is a back view of the flexible washer which secures the nut.

In the drawings the bolts are shown as passing through one plate only; but in practice two or more plates are usually bolted together.

A is a plate through which the bolts are passed and secured by a nut. It is intended to represent one end of a fish-plate, by which the ends of railway-bars are secured together. There are generally two such plates embracing the web of the rail through which the bolts pass. The holes are usually made elongated in both the rail and the fish-plates.

B is the bolt. It is provided with a projection, B', or the shank is made square under the head to prevent the bolt from turning in the usual manner.

C is a nut of the usual form, commonly made with four or six sides. D is a washer resting against the plate A under the nut. It is provided with a stud or projection, D', which fits into the elongated hole through which the bolt passes, lying alongside of the shank of the bolt and preventing the washer from turning. The washer D is provided with a flexible rim, $D^2$, which extends part way up the sides of the nut, but which does not prevent the application of a wrench for the purpose of turning it. When the nut is screwed onto the bolt a part of this rim is indented, as shown in Fig. 1, which securely holds the nut from becoming accidentally unscrewed. When, however, it becomes necessary to remove the nut from the bolt, it can be readily done by forcibly turning the nut with a wrench. The corner of the nut then straightens out the indentation and leaves the washer in a condition to be used again.

The indentation in the rim is sufficient to retain the nut under all ordinary circumstances, but yields without impairing the usefulness of the washer when it is required to remove the nut.

What I claim as my invention is—

1. The washer D, provided with the projection D' and a flexible rim, $D^2$, surrounding the edge of the nut, substantially as described.

2. The combination, with an ordinary bolt and nut, of a washer provided with means for securing it from turning on the bolt, and with a rim at right angles to its plane for locking the nut by being indented, substantially as described.

HENRY C. HILL.

Witnesses:
WILLIAM MURDOCK,
W. F. CURTIS.